United States Patent
Campbell et al.

(10) Patent No.: US 7,644,291 B2
(45) Date of Patent: Jan. 5, 2010

(54) DEVICE THROTTLING SYSTEM FROM NEIGHBORING DEVICE

(75) Inventors: Keith M. Campbell, Raleigh, NC (US); Jeffery M. Franke, Apex, NC (US); Donald E. Johnson, Apex, NC (US); Brooks Johnston, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 11/323,861

(22) Filed: Dec. 30, 2005

(65) Prior Publication Data
US 2007/0157037 A1 Jul. 5, 2007

(51) Int. Cl.
*G06F 1/00* (2006.01)
(52) U.S. Cl. ...................................... 713/300
(58) Field of Classification Search ................... 713/300
See application file for complete search history.

(56) References Cited
U.S. PATENT DOCUMENTS

| | | | |
|---|---|---|---|
| 6,778,386 B2 | 8/2004 | Garnett et al. | |
| 7,069,463 B2* | 6/2006 | Oh | 713/503 |
| 2006/0253633 A1* | 11/2006 | Brundridge et al. | 710/104 |
| 2007/0049133 A1* | 3/2007 | Conroy et al. | 439/894 |
| 2007/0079152 A1* | 4/2007 | Winick et al. | 713/300 |
| 2007/0260897 A1* | 11/2007 | Cochran et al. | 713/300 |

* cited by examiner

*Primary Examiner*—Chun Cao
*Assistant Examiner*—Mohammed H Rehman
(74) *Attorney, Agent, or Firm*—Steven M. Greenberg, Esq.; Cynthia Seal, Esq.; Carey, Rodriguez, Greenberg & Paul, LLP

(57) ABSTRACT

An array of electronic devices includes at least one throttlable device in the array of devices and a management module connected to the at least one throttlable device for reducing heat effects to an overheating device from neighboring devices in the array of electronic devices device. The management module is configured to detect the overheating of the overheating device, detect at least one throttlable device neighboring the overheating device and in the array of devices, and throttle the at least one throttlable device. The array of devices are an array of blade servers within a blade center, and the management module is separate from the at least one throttlable device.

17 Claims, 2 Drawing Sheets

DEVICE THROTTLING SYSTEM FROM NEIGHBORING DEVICE

BACKGROUND OF THE INVENTION

1. Field of the Invention

The disclosure relates generally to electronic systems and, more specifically, to a system and method for controlling throttlable devices within an array of devices in a computer system.

2. Description of the Related Art

Many types of electronic devices are assembled in arrays. For example, a single blade center may include several blade servers arrayed one next to another. A byproduct of the operation of the electronic devices is heat, and since the array of electronic devices are typically located in a confined area, heat generated by a single electronic device affects neighboring electronic devices and vice-versa. Many electronic devices, however, are sensitive to heat, and as a result, many electronic devices include one or more fans to cool the devices.

An issue associated with these arrays of devices occurs when one of the electronic devices overheats. The overheating may be for many reasons, but a typical reason for a device to overheat is that one or more of the fans cooling that particular device have failed. If the overheating device was alone, the overheating may not be a serious issue. However, since the overheating device is in the midst of an array of other heat-producing devices, the issue of overheating is exacerbated. Once the temperature of the device rises to a certain level, the device may fail or failsafe measures within the device may cause the device to shut down.

Although the shutting down of a particular device among an array of devices may not be a serious issue, in other instances, if the device is performing a critical function, the failure (or shutting down) of the device is an occurrence to be avoided. There is, therefore, a need for system and method for reducing the heat effects to a particular overheating device from neighboring devices in an array of devices.

BRIEF SUMMARY OF THE INVENTION

Embodiments of the invention address deficiencies of the art in respect to electronic systems and provide a novel and non-obvious method and system for reducing heat effects to an overheating device from neighboring devices in the array of electronic devices. The array of electronic devices includes at least one throttlable device in the array of devices and a management module connected to the at least one throttlable device. The management module is configured to detect the overheating of the overheating device, detect at least one throttlable device neighboring the overheating device and in the array of devices, and throttle the at least one throttlable device. The array of devices are an array of blade servers within a blade center, and the management module is separate from the at least one throttlable device.

In certain aspects, the at least one throttlable device has different levels of throttling, and the management module is configured to partially throttle the at least one throttlable device. The management module is also configured to repeat the throttling of the least one throttlable device using an increased level of throttling. The management module is configured to detect at least one additional throttlable device in the array of devices after the at least one throttlable device has reached a maximum throttle.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a block diagram of a computer system in accordance with the inventive arrangements; and.

DETAILED DESCRIPTION OF THE INVENTION

Figure 1:
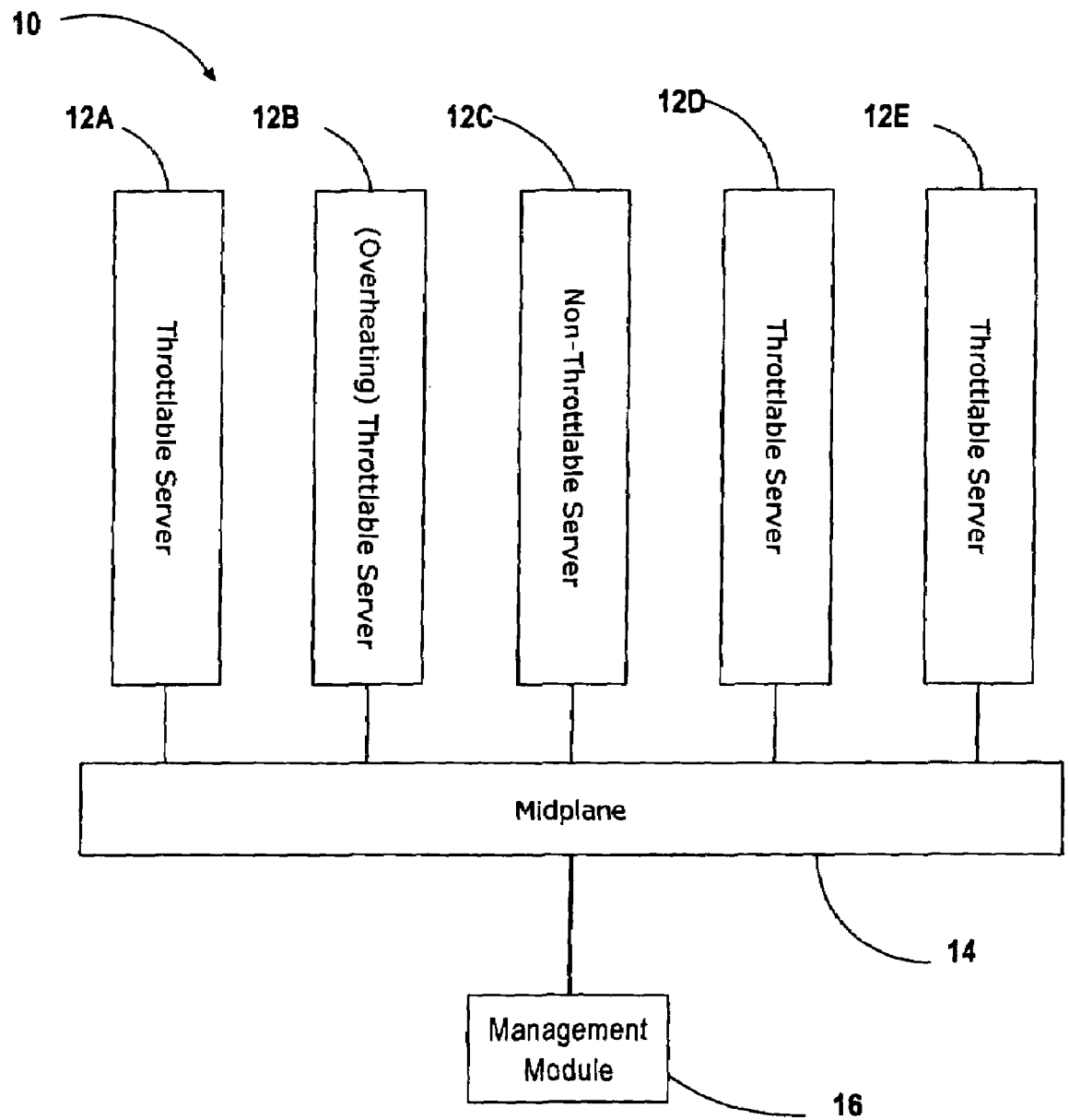

FIG. 1 illustrates an array 10 of electronic devices 12A-12E that are configured to reduce the amount of heat being generated by the array 10 when one of the electronic devices 12 begins to overheat. This reduction in heat generation is accomplished by throttling at least one of the other devices 12 that has not overheated.

The electronic devices 12 are not limited as to a particular type. Moreover, the electronic devices 12 may each be different kinds of devices. However, in certain aspects of the array 10, each of the electronic devices 12 are blade servers attached to a midplane 14 of a blade center (hereinafter, the electronic devices are referred to as servers 12) with at least one of the servers 12 being throttlable.

A throttlable server 12 is not limited in the manner in which the server 12 can be throttled (i.e., reduce power consumption). For example, portions of the server 12 may be turned off, the computing portion of the server 12 may be placed into a lower power state through clock throttling, and/or the server 12 may be limited in the amount of electrical power that the server 12 can draw from a power source.

The array 10 of servers 12 may include a management module 16. The management module 16 may be separate from the servers 12 (as shown) and/or a portion of the management module 16 may be incorporated within each of the servers 12. If multiple management modules 16 are provided, these management modules 16 may communicate between one another or the management modules 16 may operate independently.

The management module 16 makes the determination that a particular server 12B is overheating and requires temperature relief. Many different manners of determining the temperature of a particular server are known, and the management module 16 is not limited as to any manner so capable. For example, the management module 16 may employ a sensor to determine the temperature at a particular location relative to the server 12. Other examples include reading a temperature of a CPU with the server 12 and/or determining the temperature of a power supply within the server 12.

Once the management module 16 makes the determination that a particular server 12B is overheating and requires temperature relief, the management module 16 controls the process of throttling servers 12 adjacent to the overheating server 12B. By throttling servers 12 adjacent to the overheating server 12B, the amount of heat generated proximate the overheating server 12B can be reduced, which can stop or reduce the effects of overheating on the overheating server 12B.

Certain of the functional units described in this specification have been labeled as modules, in order to more particularly emphasize their implementation independence. For example, a module may be implemented as a hardware circuit comprising custom circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
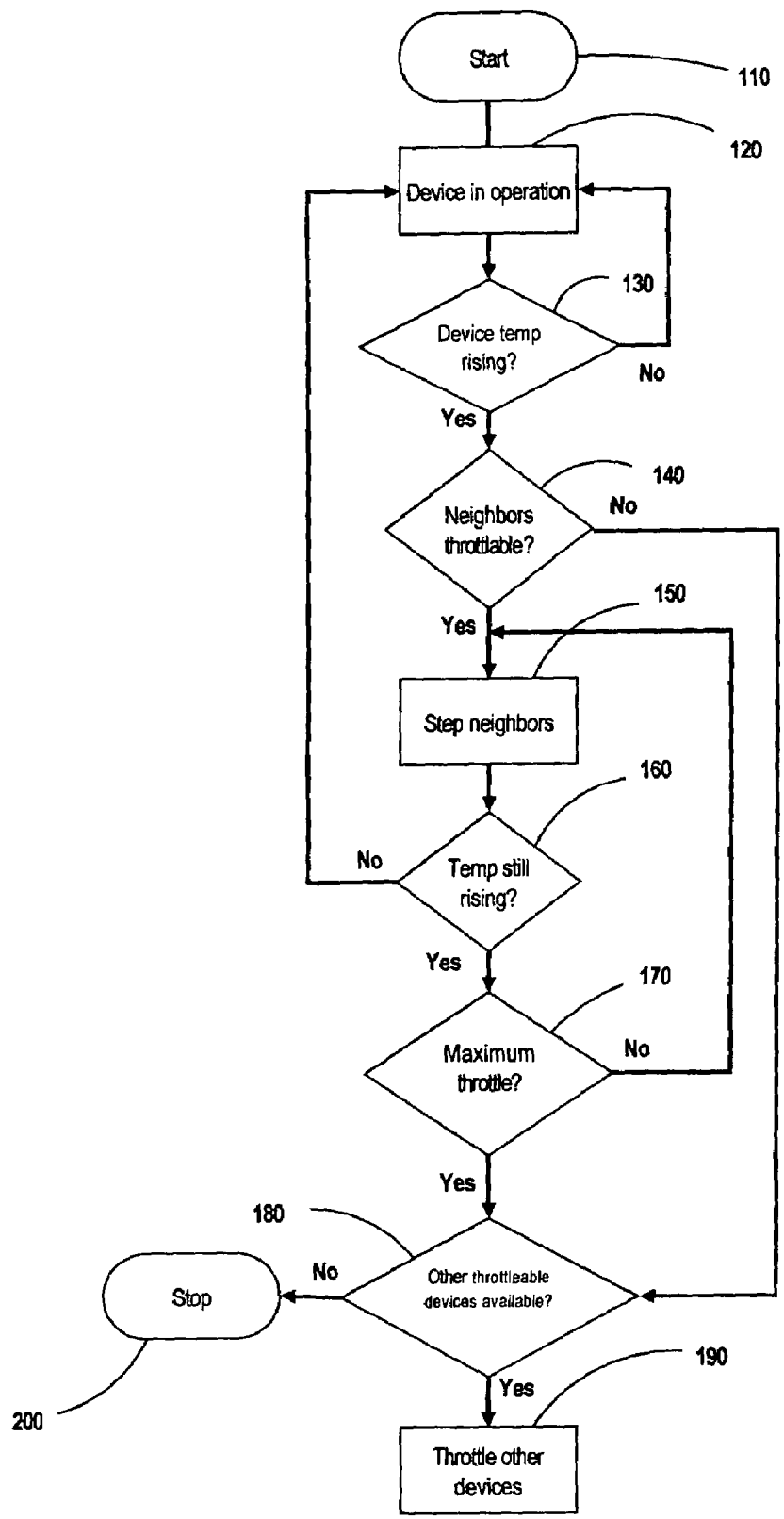
FIG. 2 is a flow chart diagram illustrating a method of reducing heat to an overheating device from neighboring devices in accordance with the inventive arrangements.

FIG. 2 illustrates an exemplary process for reducing the heat effects to an overheating device from neighboring devices in an array 10 of devices 12. In certain instances, at step 110, the process starts and proceeds to step 120 after the overheating server 12B has exhausted any self-corrective actions that can be performed to reduce the amount of heat generated by the server 12B. For example, if the server 12B is throttlable, the server 12B may be throttled down and/or portions of the server 12B may be shut down to reduce the amount of heat being generated by the overheating server 12B itself.

There may be circumstances, however, where actions that could be taken by the overheating server 12B are not taken prior to the process proceeding to step 120. For example, although the overheating server 12B may be able to throttle and/or shut down portions of the server 12B, it is not desirable to take these actions because to do so would impair a critical function of the server 12B. In this circumstance, for example, it may be desirable that other servers 12, and not the overheating server 12B, take action to reduce the amount of heat being generated.

In other instances, the server 12B itself cannot take measures to reduce the amount of heat being generated by the overheating server 12B since the sever 122B is non-throttlable. In these instances, the process proceeds to step 120.

In step 130, a determination is made as to whether or not an additional action needs to be taken to reduce the heat effects to the overheating server 12B from neighboring devices in the array 10 of servers 12. The manner in which this determination is made is not limited as to a particular measurement and/or circumstance. For example, the determination may be made after the overheating server has been above a particular temperature after a specified length of time. In certain aspects, this determination is made after the temperature of the overheating server 12B has risen past a specified temperature.

In step 140, after a determination is made that an additional action needs to be taken, a determination is made as to whether or not any throttlable servers 12 are neighboring, and the methodology is not limited in the manner in which this determination is made. For example, a neighboring server 12 may be defined by the relative physical proximity of the server 12 to the overheating server 12B.

Additionally, the determination may take into account how heat is transferred from one server 12 to the overheating server 12B. For example, the airflow patterns around the overheating server 12B may dictate that a server 12 upstream of the overheating server 12B be considered to be "neighboring" and a server 12 downstream of the overheating server 12B may be considered not to be neighboring even though the upstream server 12 is physically further away from the overheating server 12B than the downstream server 12. Example of different types of heat transfer include a fan that creates an airflow (i.e., forced convection) and heated air rising (i.e., free convection).

As previously described, many types of throttlable servers 12 exist and the methodology is not limited as to a particular type of throttlable server 12. However, the methodology may taken into account whether or not the throttlable server 12 is throttlable at that particular time. For example, a server 12 may be throttlable in most instances, but in certain instances, the same server 12 may not be deemed throttlable because that particular server 12 is currently performing a critical function and cannot be throttled without hampering the capability of the server 12 to perform the critical function.

Using the example configuration illustrated in FIG. 1, servers 12A and 12C can be deemed as neighboring the overheating server 12B. However, since server 12C is not a throttlable, only server 12A is considered to be neighboring and throttlable.

In step 150, once one or more neighboring throttlable servers 12A have been identified, these servers 12A are throttled, and the manner by which the servers 12A are throttled is not limited. For example, certain throttlable servers 12A may have different levels of throttling, and more than one neighboring throttlable server 12 may be present. Thus, the management module 16 may prioritize which particular neighboring throttlable server 12 is throttled and/or the level to which the throttlable server 12 is throttled. This prioritization may be based, for example, on the relative importance of one server 12 to the next and/or upon the anticipated cost (in performance) to benefit (in heat reduction) ratio of the various levels of throttling available from the one or more throttlable servers 12A. If, however, only a single level of throttling is available from a single throttlable server 12A, the throttlable server 12A may be throttled without any additional determination and the methodology may proceed to step 160.

In step 160, a determination is made whether or not additional throttling is required, and if so, in step 170, a determination is made as to whether of not additional throttling can be performed by the neighboring throttlable servers 12A. If additional throttling can be performed, the process proceeds back to step 150. The manner in which the determination is made whether or not additional throttling is required in not limited. However, in certain aspects, the determination is made that additional throttling is required if the device temperature continues to rise after a predetermined period of time.

In step 170, if a determination is made that maximum throttle has been reached with the neighboring servers 12A, a determination is made as to whether or not other additional throttlable servers 12 are present. Using the example configuration illustrated in FIG. 1, the servers 12D and 12E can be deemed as additional throttlable servers. These servers 12D, 12E may then be throttled in step 190, which is comparable to step 150. However, if no additional throttlable servers 12 are present, the process ends at step 200.

The process illustrated in FIG. 2 describes the methodology when the temperature of the overheating server 12B does not stop rising. However, the methodology is not limited in this manner. Upon a determination that the temperature of the overheating server 12B has been arrested and/or begins to drop, the throttling process may be reversed so that those servers 12 that have been throttled down may be restored to their normal operating state.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A management module for reducing heat effects to an overheating device from neighboring devices in an array of electronic devices, comprising:
   a connection to at least one throttlable device in the array of devices, wherein
   the management module is configured to
      detect the overheating of the overheating device,
      detect at least one throttlable device neighboring the overheating device and in the array of devices, and
      throttle the at least one throttlable device after the overheating device has reached a maximum throttle for operation of the overheating device, wherein
   the array of devices are an array of blade servers within a blade center,
   the at least one throttlable device has different levels of throttling, and
   the management module is configured to partially throttle the at least one throttlable device.

2. The management module according to claim 1, wherein the management module is configured to repeat the throttling of the least one throttlable device using an increased level of throttling.

3. The management module according to claim 1, wherein the management module is separate from the at least one throttlable device.

4. The management module according to claim 1, wherein, after the at least one throttlable device has been throttled and based upon a predetermined condition, the at least one additional throttlable device is additionally throttled.

5. The management module according to claim 1, wherein the overheating device is not throttled after the overheating device is detected as overheating.

6. The management module according to claim 1, wherein the management module is configured to detect at least one additional throttlable device in the array of devices.

7. An array of electronic devices, comprising:
   at least one throttlable device in the array of devices; and
   a management module connected to the at least one throttlable device for reducing heat effects to an overheating device from neighboring devices in the array of electronic devices device, wherein
   the management module is configured to
      detect the overheating of the overheating device,
      detect at least one throttlable device neighboring the overheating device and in the array of devices, and
      throttle the at least one throttlable device after the overheating device has reached a maximum throttle for operation of the overheating device, wherein
   the array of devices are an array of blade servers within a blade center,
   the at least one throttlable device has different levels of throttling, and
   the management module is configured to partially throttle the at least one throttlable device.

8. The array according to claim 7, wherein the management module is configured to repeat the throttling of the least one throttlable device using an increased level of throttling.

9. The array according to claim 7, wherein the management module is separate from the at least one throttlable device.

10. The array according to claim 7, wherein, after the at least one throttlable device has been throttled and based upon a predetermined condition, the at least one additional throttlable device is additionally throttled.

11. The array according to claim 7, wherein the overheating device is not throttled after the overheating device is detected as overheating.

12. The array according to claim 7, wherein the management module is configured to detect at least one additional throttlable device in the array of devices.

13. A method for reducing heat effects to an overheating device from neighboring devices in an array of electronic devices, comprising the steps of:
   detecting the overheating of the overheating device in the array of devices;
   detecting at least one throttlable device neighboring the overheating device and in the array of devices; and
   throttling the at least one throttlable device after the overheating device has reached a maximum throttle for operation of the overheating device, wherein,
   the array of devices are an array of blade servers within a blade center,
   the at least one throttlable device has different levels of throttling, and
   the throttling step partially throttles the at least one throttlable device.

14. The method according to claim 13, further comprising the step of repeating the throttling step using an increased level of throttling.

15. The method according to claim 13, wherein, after the at least one throttlable device has been throttled and based upon a predetermined condition, the at least one additional throttlable device is additionally throttled.

16. The method according to claim 13, wherein the overheating device is not throttled after the overheating device is detected as overheating.

17. The method according to claim 13, further comprising the step of detecting at least one additional throttlable device in the array of devices.

* * * * *

UNITED STATES PATENT AND TRADEMARK OFFICE
CERTIFICATE OF CORRECTION

PATENT NO. : 7,644,291 B2  Page 1 of 1
APPLICATION NO. : 11/323861
DATED : January 5, 2010
INVENTOR(S) : Campbell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 853 days.

Signed and Sealed this

Sixteenth Day of November, 2010

David J. Kappos
*Director of the United States Patent and Trademark Office*